(12) United States Patent
Calamvokis et al.

(10) Patent No.: US 6,408,374 B1
(45) Date of Patent: Jun. 18, 2002

(54) HASHING METHOD AND APPARATUS

(75) Inventors: Costas Calamvokis, Mountain View, CA (US); Aled Justin Edwards, South Gloucestershire (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/303,461

(22) Filed: Apr. 30, 1999

(30) Foreign Application Priority Data

May 1, 1998 (EP) ............................................. 98303426

(51) Int. Cl.[7] ............................................. G06F 12/10
(52) U.S. Cl. ........................ 711/216; 711/213; 711/217; 711/218; 711/219; 711/220
(58) Field of Search .................. 711/200–209, 213–221, 711/212

(56) References Cited

U.S. PATENT DOCUMENTS

| | | | |
|---|---|---|---|
| 3,366,927 A | | 1/1968 | Falkoff |
| 4,290,105 A | * | 9/1981 | Cichelli et al. ................. 707/5 |
| 5,446,881 A | | 8/1995 | Mammel, Jr. .................. 707/1 |
| 5,745,686 A | * | 4/1998 | Saito et al. ................... 709/242 |
| 5,878,409 A | * | 3/1999 | Baru et al. .................... 707/2 |
| 6,014,733 A | * | 1/2000 | Bennett ........................ 711/216 |

OTHER PUBLICATIONS

"Efficient hardware hashing functions for high performance computers", Ramakrishna, M.V. et al., Computers, IEEE Transactions. vol. 46. Dec. 12, 1997. pp. 1378–1381.*
ANONYMOUS: "Predistributed Logical Name Generation. Jun. 1975" IBM TECHNICAL DISCLOSURE BULLETIN vol. 18, No. 1, Jun. 1975, pp. 38–39, XP002081312 New York, US *the whole document*.
ANONYMOUS: "One Time Pad Digital Signature Technique. Aug. 1978." IBM TECHNICAL DISCLOSURE BULLETIN, vol. 21, No. 3, Aug. 1978, pp. 1316–1318, XP002081313 New York, US *the whole document*.

* cited by examiner

*Primary Examiner*—Than Nguyen

(57) ABSTRACT

A hashing method and apparatus uses a hash function that can be modified in real time by a hash control code. The hash function involves the combining together of multiple bit-shifted versions of a multi-bit input to produce a transformed value from which the hash output is formed. The hash control code is used to set the number of input versions used to produce the transformed value and their respective degrees of bit-shifting. The hashing method and apparatus may be used in executing processor branch instructions where the identity of an item to be accessed occupies a search space that varies in size and degree of population between different branch instructions.

35 Claims, 5 Drawing Sheets

HASHING METHOD AND APPARATUS

FIELD OF THE INVENTION

The present invention relates to a method of hashing a multi-bit input to a shorter bit-length output, where parameters of the hashing function used can be varied.

BACKGROUND OF THE INVENTION

Hashing is a process by which a relatively long input is transformed into a shorter output. Hashing is used for many different purposes including memory look-up and for forming message authentication codes. A large number of different hashing functions are known.

FIG. 1 of the accompanying drawings illustrates a typical application of hashing in the context of memory look-up. An input, for example a 48-bit input 10, is to be used to retrieve data held in memory 11. In the current example, only a relatively small number of the possible values of the input 10 are of interest (for example, seven values). It would therefore be highly inefficient to have a respective location 12 in memory 11 for each possible value of the input 10. Instead, the memory is provided with a number of locations 12 equal, to or greater than, the number of input values of interest (but less than all possible input values), and the input 10 is applied to a hashing function 13 that transforms the input 10 into a shorter length index 14 matched to the size of the memory (in the current example, this might be a 3-bit index). The hashing function 14 is chosen such that every input value of interest produces a unique value of the index 14 and this latter value is then used to access a corresponding location of the memory 11—this location being that used to store the data that it is desired to associate with the input value concerned.

Of course, many values of the input 10 will give rise to the same index value but it is only desired to register a "hit" (a valid output of data from the memory 11) for the input value of interest that hashes to that index value. Accordingly, along with the data to be output, each memory location stores a check value corresponding to the input value for which that data is valid. When a memory location 12 is accessed, the check value is compared in comparator 15 with the current value of the input 10 and a data valid output 16 is only produced if there is a match. If the check value and input value do not match, a "miss" occurs. In so-called "perfect" hashing where every input value of interest is mapped by the hashing function 13 into its own unique value of index, this is the end of the process; however, it is often more efficient to practice "non-perfect" hashing in which there are some clashes between values of interest. In such cases, various strategies have been devised; for example, the indexed location may give access to a linked list of values of interest associated with that location. Another strategy is to effect "re-hashing" (that is, carrying out a hash retry) generally using a different hash function from that originally employed. Re-hashing strategies may extend to multiple re-hashing attempts each with a different predetermined hash function.

Generally, in any particular application the hash function is predetermined though, as already indicated, it is also known to have a set of predetermined hash functions from which the function to be used is chosen.

It is an object of the present invention to provide a more flexible hashing arrangement.

SUMMARY OF THE INVENTION

According to the present invention, there is provided a method of hashing a multi-bit input to a shorter bit-length output, the method involving the steps of:

(a)—receiving said input and a hash control code, (b)—forming a transformed value by combining together at least portions of different versions of said input, said hash control code serving to set specific parameters of this forming, and (c)—using said transformed value to provide said output.

Preferably, the different versions of the input are bit-shifted versions of the input, the number of these different versions and their respective degrees of bit shifting being determined by the hash control code. Advantageously, the hash control code is a multi-bit code, with the state of each of at least some of the bits of the hash control code determining the presence or absence, in the step (b) combining, of a version of the input that corresponds to the bit shifting of the input by an amount dependent on the position of the relevant hashing control-code bit in that code. It should be appreciated that the aforesaid different versions (25) of the input may not be explicitly formed as separate bit strings but can be derived as needed (in whole or in part) by appropriately offset accesses to the original input (that is, by appropriate wiring into a register holding the input). Step (b) may involve combining all or only portions of said different versions of the input to produce the transformed value with multiple bits. Depending on the size of the transformed value, step (c) may involve selecting bits from the transformed value to produce the output.

The hashing method is advantageously used as part of a memory look-up method for accessing stored items which are held in respective locations in memory and which are associated with particular values of a multi-bit input. In one application of the invention, the memory look-up method is used in the course of execution of an instruction to retrieve an element from memory in dependence on the value of particular input data subject of the currently-executing instruction. The hashing method of the invention is suited to such an application because the identity of the element to be retrieved will often occupy a search space that varies in size and degree of population between different instructions, and it is therefore very useful to be able to change the hash function from one instruction to another to match the search space characteristics. When the search space characteristics are the same for different instructions, then the memory look-up method can advantageously be invoked as a called routine returning a value that is indicative of the location of the item to be retrieved in the context of the current instruction.

According to another aspect of the present invention, there is provided apparatus for hashing a multi-bit input to a shorter bit-length output, the apparatus comprising:

means for receiving said input and a hash control code, means for forming a transformed value by combining together at least corresponding portions of multiple bit-shifted versions of said input, the number of such versions and their respective degrees of bit-shifting being determined by said hash control code, and means for using said transformed value to provide said output.

Preferably, the different versions of the input are bit-shifted versions of the input, the number of these different versions and their respective degrees of bit shifting being determined by the hash control code; in this case, the means for forming a transformed value may comprise:

first register means for storing the input, the first register means being accessible over its length so as to permit access to said versions by appropriately offset access into the first register means;

second register means for storing said hash control code;
exclusive-OR means; and gate means connected to said first and second register means for controlling the passing to said exclusive-OR means of bits of said different versions of the input in dependence on the value of the hash control code, the output of said exclusive-OR means constituting said transformed value.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
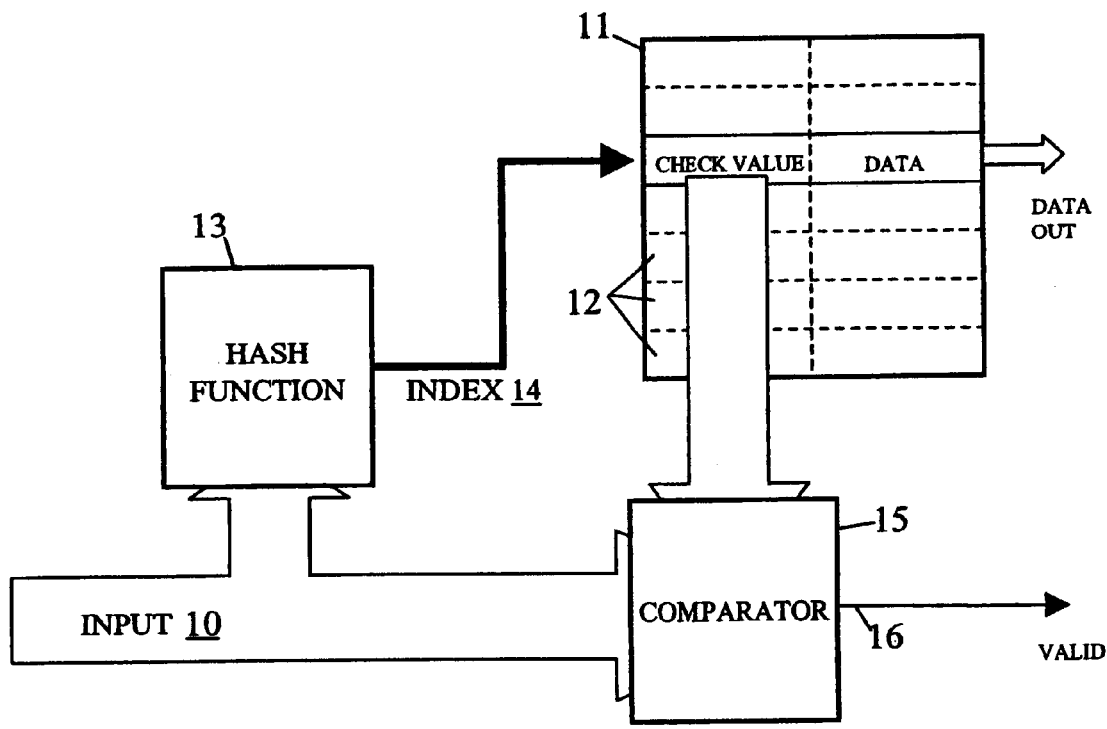
FIG. 1 is a diagram of a prior art memory look-up method using a hashing function.
Figure 2:
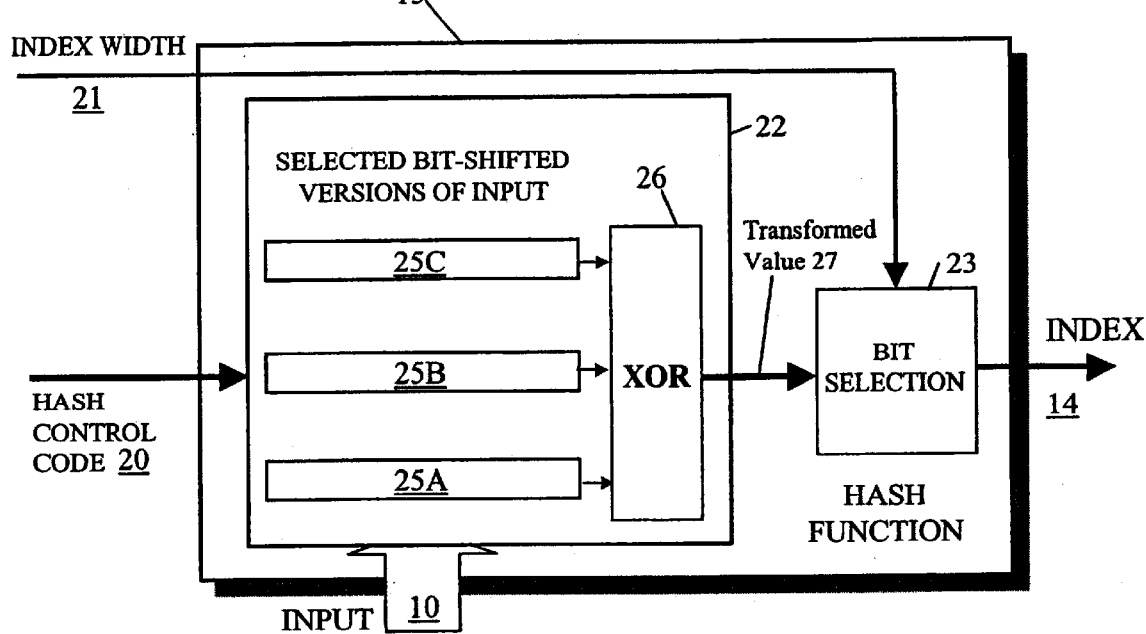
FIG. 2 is a diagram illustrating a preferred form of hashing function block of the present invention.
Figure 3:
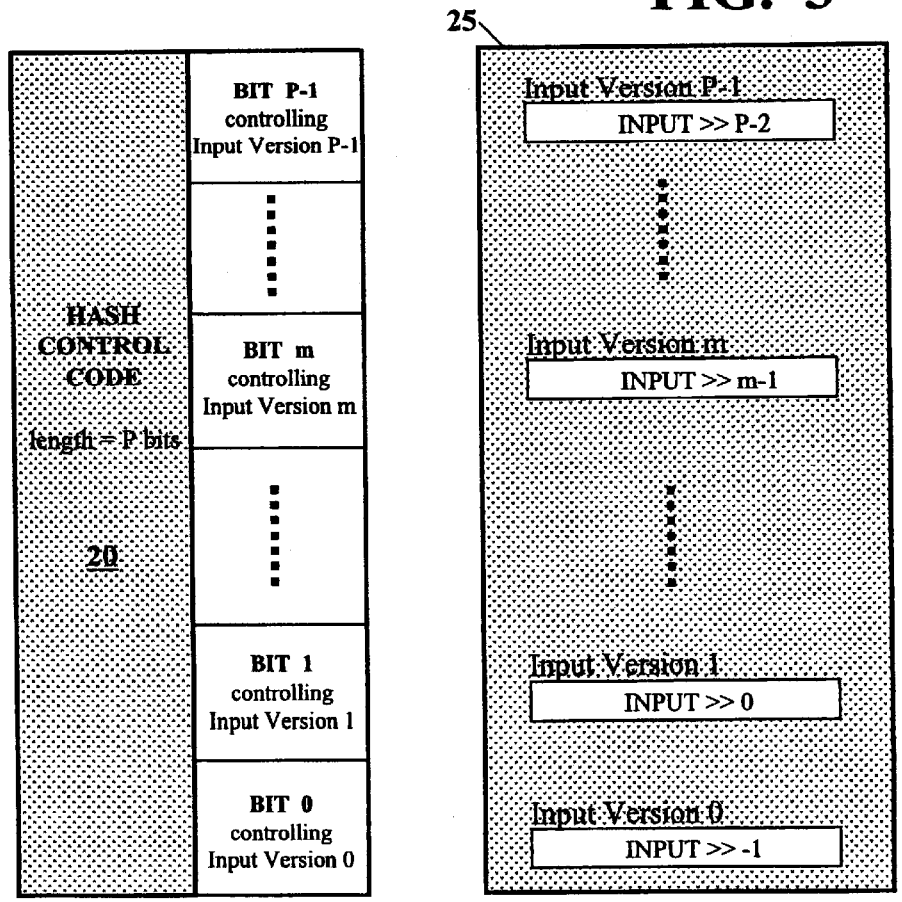
FIG. 3 is a diagram showing a hash control code supplied to the FIG. 2 hashing function block.

FIGS. 2 and 3 illustrate the principle of operation of a hashing functional block embodying the invention by which a hash control code 20 is used to control the parameters of the hashing function. This hashing functional block may, for example, serve as the block 13 of FIG. 1, hashing input 10 to index 14. Because the hashing function can be controlled, it can be adapted to suit different search space problems (that is, to suit situations that differ one from another in terms of the characteristics of the input relative to the number and identity of the input values of interest), the index 14 being applied to an appropriately-sized memory space relevant to the current input.

The form of the hashing functional block 13 shown in FIG. 2 comprises a combining block 22 and a bit selection block 23. The combining block 22 serves to form an intermediate value 27 (termed a "transformed value" below) by combining together, in exclusive-OR block 26, different bit-shifted versions 25A, 25B and 25C of the input 10; the number and degree of bit shifting of these input versions 25 is determined by the hash control code 20. The bit-selection block then forms the index 14 by selecting bits from the transformed value 27, the number of these bits being determined by an index-width parameter 21 (which effectively specifies the size of the memory space to be accessed by index 14).

How the hash control code 20 is used to control which input versions are combined together is diagrammatically depicted in FIG. 3. The combining block 22 has the potential to create (at least notionally, if not explicitly) P bit-shifted versions of the input, these versions being labelled Version 0 to Version (P−1) in FIG. 3. These versions are progressively further bit shifted right by increments of one bit from Version 0 to Version P−1) with Version 0 being right shifted (−1) relative to the original input 10 (that is, left-shifted by 1). In the present example, the input is shifted and not circulated to form the input Versions 0 to (P−1) with zero values being added to fill otherwise undefined bit positions outside of the input sequence.

The hash control code 20 has P bits extending from bit position 0 to position P−1. If the code 20 has a "1" in a particular bit position, then the corresponding input version is presented to XOR block 26 for combination with other versions so presented. For example, if bit positions 2, 7 and 9 of the code 20 are "1"s and all other positions "0", then input Versions 2, 7 and 9 (corresponding to right shifts of 1 bit, 6 bits and 8 bits respectively), are combined in the XOR block 26 to form the intermediate transformed value 27.

Figure 4:
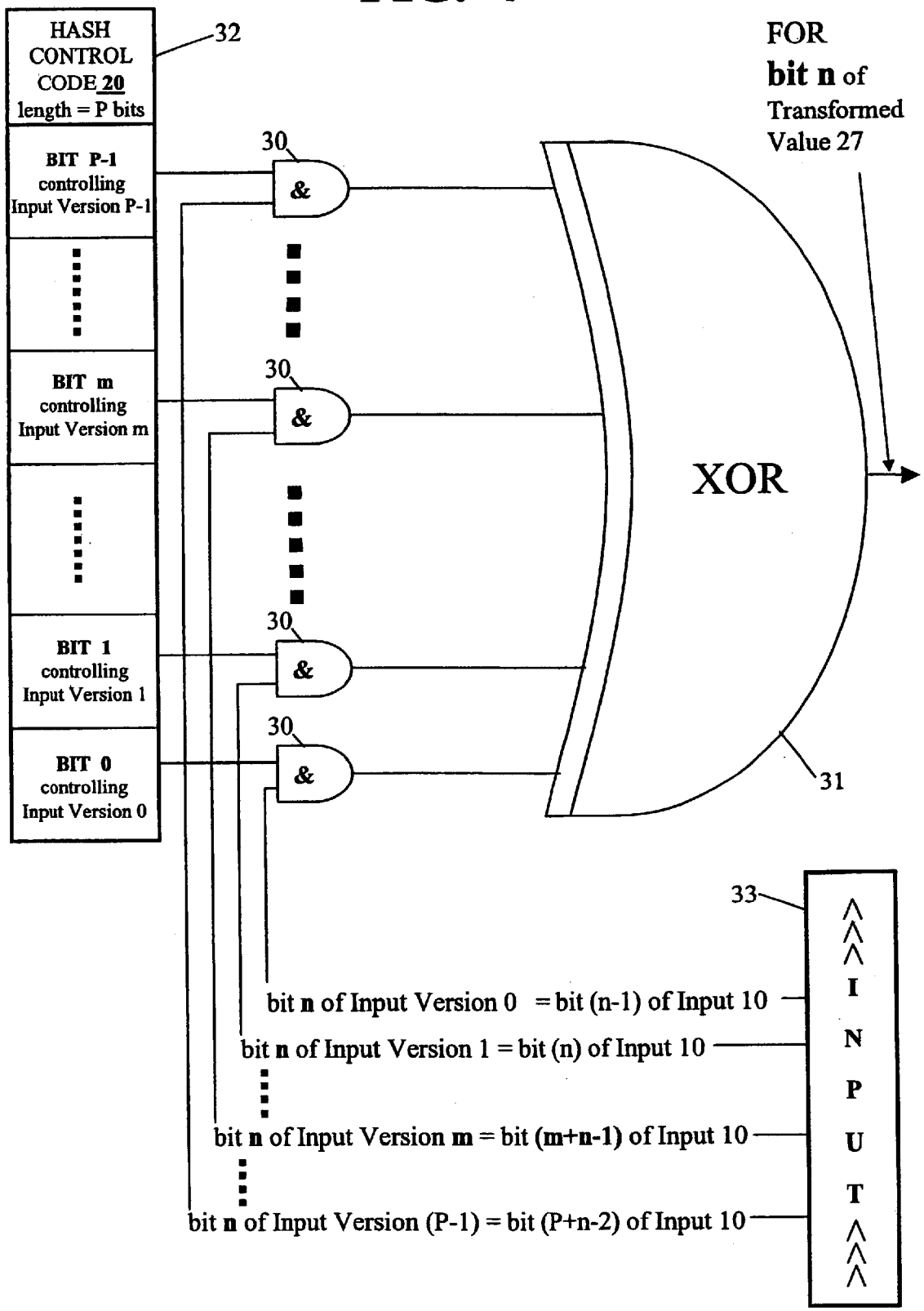
FIG. 4 is a block circuit diagram showing the derivation of one bit of a transformed value formed by the FIG. 2 function block.

FIG. 4 illustrates circuitry for effecting version selection and combination for generating one bit (the bit in bit position "n") of the transformed value 27. More particularly, the hash control code is held in register 32 and each bit is used to control a corresponding two-input AND gate 30; the outputs of all the gates 30 are fed to an XOR gate 31. The other input of each gate 30 receives bit "n" of the input Version that corresponds to the hash control code bit controlling that gate (bit 0 being the first bit position in each version). These bit "n" values for all input versions can be simply derived by tapping appropriate cells of a register 33 that holds the input 10 padded each end with zero bits. Thus bit "n" of input version "m" is bit (m+n−1) of input 10.

As is apparent, only the bit "n" s of the input versions enabled by the corresponding bits of the hash control code 32 will be passed to the XOR gate 31. This gate produces a "1" output when supplied with an odd number of "1"s, and a "0" output otherwise.

The FIG. 4 circuitry, other than registers 32, 33, is repeated for each bit of the transformed value (which may, for example, be a 16-bit value).

With regard to the bit-selection block 23, in the present example this takes bit 1 to bit (index-width) of the transformed value, and outputs them as the index 14. More complex selection patterns may alternatively be used. Suitable circuitry for implementing block 23 will be apparent to persons skilled in the art.

By way of example, a hash control code of 'h1dbb764747a (where 'h indicates hexadecimal notation) and an index width of 3 will discriminate between the following six 48-bit input values:

'h080009732b60
'h080009732d68
'h080009732fd8
'h080009732de8
'h080009732cf8
'h0800097329d8

From the foregoing, it will be seen that the hash control code provides a convenient and flexible way of providing a very large number of different hash functions. Determination of the hash control code needed to produce the hash function best suited for a particular purpose (for example, for achieving perfect hashing within the minimum memory space) can be determined by an automated trial and error process. Once the desired hash control code has been determined, then it can be applied to the hashing functional block 13 whenever a relevant input 10 is received. At the same time, the appropriate index width input 23 is also provided.

In fact, trial and error determination of a suitable hash control code could potentially take a long time and it is therefore convenient to take steps to improve the chances of success if trial and error does not produce a successful result after a given number of tries. In particular, the size of the index width can be increased to give a larger target (the penalty being that more memory will be required). Another approach is to allow re-hashing—that is, not always to seek to achieve perfect hashing but to allow for input values of interest to hash to the same index (and thus memory location) with only one of these values being validated—any non-validated accesses to a memory location giving rise to a re-hash using a different hash function.

Figure 5:
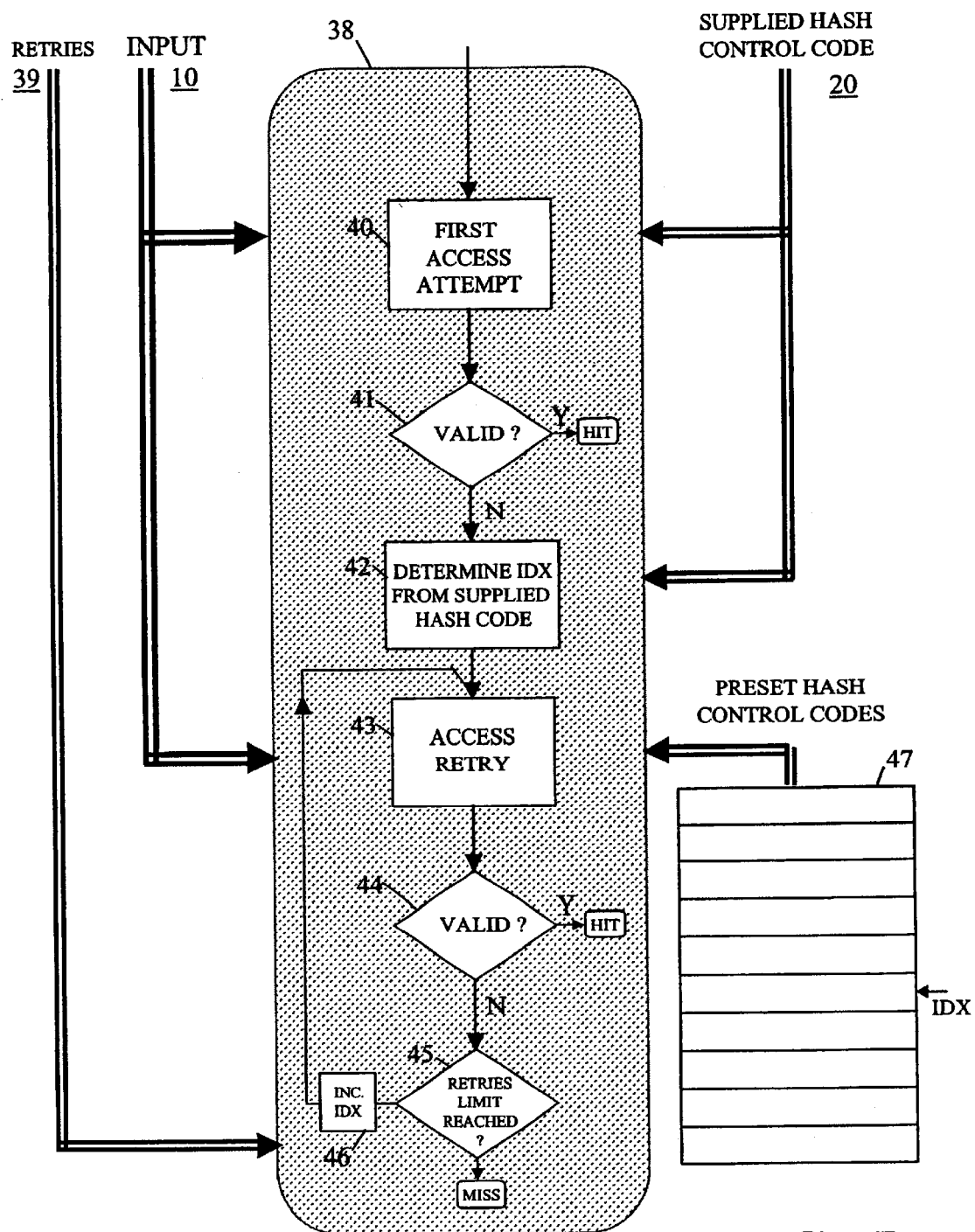
FIG. 5 is a flow chart showing a hashing method embodying the invention that involves carrying out retries in the event of a non-validated memory access.

This approach is illustrated in FIG. 5 where steps 40 to 46 within box 38 represent the overall hashing process. More particularly, at step 40 a first memory access attempt is made on the input 10 using the supplied hash control code 20 (and index width, this latter not being illustrated as it is constant for the whole hashing process). At step 41, the validity of the memory access attempt is checked by comparing the input 10 with the check value stored in the accessed location; if validated (a "hit") the hashing process is exited. However, if a "hit" is not achieved, a new memory access attempt is made using a hash control code selected from a set 47 of predetermined codes; the identity of the chosen code is given by determining (step 42) the value of an index idx into the set 47 on the basis of the terminating bits of the supplied hash control code 20. Using the selected predetermined hash control code, a new access attempt is made (step 43) and its validity is checked (step 44). If a "hit" is achieved, the hashing process is exited; otherwise, the value of idx is incremented (step 46) and a further retry is made with the new predetermined hash control code pointed to by idx. The number of retries permitted is limited by a retry value 39, the current number of retries being tested against this value 39 in step 45 (it being understood that a count is kept of the number of retries). If a "hit" is not achieved after the maximum number of retries permitted, a "miss" is output to indicate that the input value was not one of interest, and the hashing process exited. It will be appreciated that the initial hash control code 20, the index width and the number of permitted retries are chosen to ensure that all input values of interest will result in a "hit").

Figure 6:
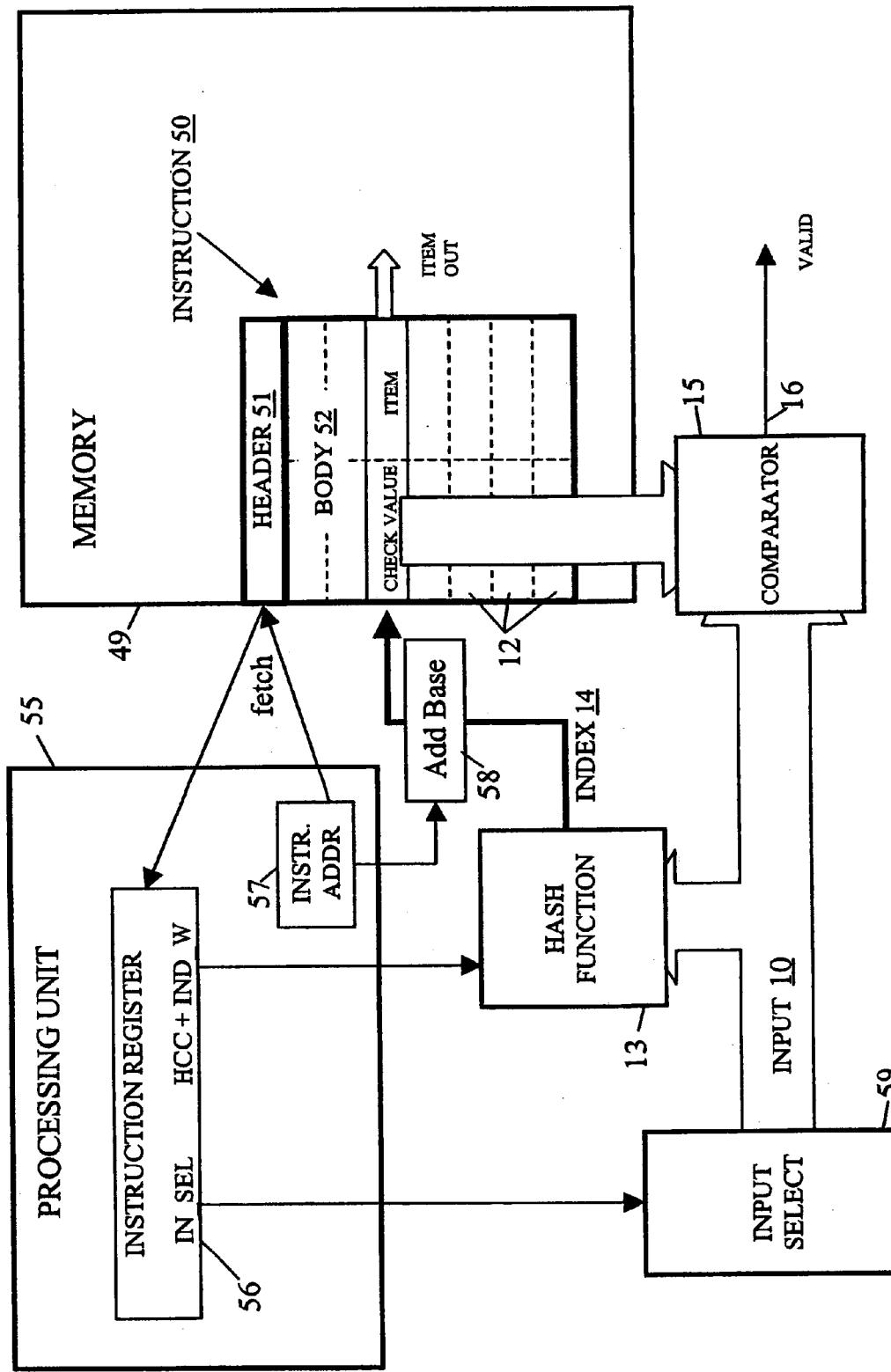
FIG. 6 is a diagram illustrating a processing system utilising an embodiment of the present invention.

FIG. 6 illustrates one application of the hashing method and means described above. In this application, a processing unit 55 is arranged to execute instructions held in memory 49. These instructions include an instruction type in which an item is retrieved from memory in dependence on the value of an input 10 where only some of the input values are of interest—instruction 50 is an instruction of this type. Instruction 50 includes an instruction header 51 and an instruction body 52, the latter being a set of check-value/item pairs corresponding to respective ones of the different input values of interest, these check-value/item pairs being held in the memory locations following the instruction header 51. Retrieval of the item corresponding to an input value of interest is achieved using hashing as will now be described.

The instruction header 51 is passed to an instruction register 56 of the processing unit 55 when the instruction is called by the unit (an instruction address register 57 in the unit 55 holds the address of the instruction to be fetched and executed). The instruction header 51 includes a field IN_SEL that serves to specify the source of the input 10 and the contents of this field are passed from the instruction register 56 to an input selection unit 59 which fetches the desired input. The instruction header also includes a field specifying a hash control code (HCC) and a field specifying an index width (IND_W), both of which parameters are passed to a hashing functional block 13 of the form described above with reference to FIGS. 2 to 4. Block 13 generates an index 14 which is added in unit 58 to the base address represented by the address in memory of the instruction 50; the result is then used to access the corresponding memory location and retrieve the check-value/item pair held therein. If the retrieved check-value and current input value match, the corresponding item is output; otherwise a miss is reported. How the output item is used may be specified in the instruction header or it may be coded into the item itself; typically, the item will be an action to be executed, a value to be output, or a jump instruction to the processing unit 55.

It will be appreciated that in the context of the FIG. 6 application, it is very useful to be able to control the hashing function through use of a hash control code because both the source of the input 10 and the number of input values of interest may vary between instructions 50. Use of a single hash function or even a set of predetermined hash functions in this context would be unlikely to provide the hashing efficiency required in practical systems.

When the search space characteristics are the same for more than one instruction 50, then the hash-based memory access method can advantageously be invoked as a called routine returning an index value indicative of the location of the item to be retrieved relative to the header of the current instruction 50.

A number of variants are, of course, possible to the described embodiments of the invention. For example, whilst the hash control code has been described as controlling the number and degree of bit-shifting of the input versions 25, additional or different parameters of the hashing function could be controlled. Thus, the hashing control code could include bits for specifying the function used to combine the input versions (multiplication of the versions, etc), and/or for specifying circulation rather than shifting of the input, and/or for specifying the direction and magnitude of shifting/circulation between versions, and/or the ordering of the bits selected by bit-selection block 23, etc.

Furthermore, at least the bit selection function of the bit-selection block 23 can be implemented within the FIG. 4 form of the combining unit 22 by disabling those instances of the gating circuitry (elements 30, 31) related to bits of the transformed value that are not required for the current index.

With respect to FIG. 5, rather than the control codes used for hash retries being selected from a predetermined set of codes (47), each hash code could be computed from the current one using some kind of XORing function.

What is claimed is:

1. A method of hashing a multi-bit input to a shorter bit-length output, said method involving the steps of:
    (a)—receiving said input and a hash control code,
    (b)—forming a transformed value by combining together at least portions of different versions of said input, said hash control code serving to set specific parameters of this forming, and
    (c)—using said transformed value to provide said output, wherein said different versions of the input are bit-shifted versions of the input, the number of said different versions and their respective degrees of bit shifting being determined by said hash control code.

2. A method according to claim 1, wherein said different versions of the input are not explicitly formed but said at least portions thereof are derived as needed by appropriately shifted accesses to said input.

3. A method according to to claim 1, where said hash control code is a multi-bit code, the state of each of at least some of the bits of the hash control code determining the presence or absence, in the step (b) combining, of a said version of the input that corresponds to the bit shifting of the input by an amount dependent on the position of the relevant hashing control-code bit in that code.

4. A method according to claim 1, wherein said at least portions of different versions of said input are combined by an exclusive-OR operation.

5. A method according to claim 1, wherein step (c) involves using selected bits of said transformed value to provide said output.

6. A method according to claim 5, wherein said selected bits are taken from said transformed value between a pre-determined first bit position and a second bit position determined by a supplied index-width value.

7. A method according to claim 1, wherein step (b) involves producing said transformed value by combining portions only of said different versions of the input; step (c) involving using said transformed value for said output.

8. The method according to claim 1, wherein said method comprises operating a hashing functional entity to hash the multi-bit input to the shorter bit-length output, and said function entity receives both said input and the hash control code, the hash control code being variable, and said hash control code sets the specific parameters of the forming in dependence on the current value of the hash control code.

9. A memory look-up method for accessing stored items which are held in respective locations in memory and which are associated with particular values of a multi-bit input, said method comprising the steps of:

(i)—receiving said input and a hash control code;

(ii)—hashing said input to produce an index by using the method according to claim 1 with the output provided thereby forming said index, this index indicating a location in memory that holds a stored item associated with a said particular value of said input, and (iii)—using the index to access the memory.

10. A memory look-up method according to claim 9, wherein the memory location indicated by the index holds, in addition to the corresponding stored item, a validation value equal to one value of said input effective to result in access to that location, the memory look-up method comprising the further step of:

(iv)—comparing the validation value held in an accessed location with said input to validate accesses to the location only in cases where the input has said one value.

11. A memory look-up method according to claim 10, wherein in cases where the validation value differs from the input, steps (ii) to (iv) are repeated but using for said hash control code, a control code determined locally rather than a received one.

12. A memory look-up method according to claim 11, wherein steps (ii) to (iv) are repeated up to a given number of times, each time with a different locally-determined control code, until either an access is validated or said given number of repeats has been completed without a validated access being achieved.

13. A memory look-up method according to claim 11, wherein the locally-determined control code is selected from a set of such codes, this selection being dependent on the value of hash control code received in step (i).

14. The memory look-up method according to claim 9, wherein hashing said input to produce an index by using a method according to claim 1 comprises a method of operating a hashing functional entity to hash a multi-bit input to a shorter bit-length output, said method comprising the steps of:

(a) receiving at the functional entity both said input and a variable hash control code;

(b) forming a transformed value by combining together at least portions of different versions of said input, said hash control code serving to set specific parameters of this forming in dependence on the current value of the hash control code, and (c) using said transformed value to provide said output.

15. Apparatus for hashing a multi-bit input to a shorter bit-length output, said apparatus comprising:

means for receiving said input and a hash control code, means for forming a transformed value by combining together at least corresponding portions of multiple bit-shifted versions of said input, the number of such versions and their respective degrees of bit-shifting being determined by said hash control code, and means for using said transformed value to provide said output.

16. Apparatus according to claim 15, wherein said different versions of the input are bit-shifted versions of the input, the number of said different versions and their respective degrees of bit shifting being determined by said hash control code, said means for forming a transformed value comprising:

first register means for storing said input, the first register means being accessible over its length so as to permit access to said versions by appropriately offset access into the first register means;

second register means for storing said hash control code;

exclusive-OR means; and gate means connected to said first and second register means for controlling the passing to said exclusive-OR means of bits of said different versions of the input in dependence on the value of the hash control code, the output of said exclusive-OR means constituting said transformed value.

17. The apparatus according to claim 15, wherein said means for receiving receives a variable hash control code, and the number of such versions and their respective degrees of bit-shifting being determined by the current value of said variable hash control code.

18. A method of operating apparatus in which items are retrieved from a memory in response to the receipt of corresponding respective multi-bit inputs, said method involving, for each input, the steps of:

(a)—receiving said input and an associated hash control code having a value set for that input, (b)—forming a transformed value by combining together at least portions of different versions of said input, said hash control code serving to set specific parameters of this forming in dependence on the current value of the hash control code;

(c)—using said transformed value to provide a hashed output of shorter bit length than said input; and said output (d)—retrieving an item of said items from memory at an address in memory dependent on the value of said hashed output.

19. A method according to claim 18, wherein said different versions of the input are bit-shifted, versions of the input, the number of said different versions and their respective degrees of bit shifting being determined by said hash control code.

20. A method according to claim 19, wherein said different versions of the input are not explicitly formed but said at least portions thereof are derived as needed by appropriately shifted accesses to said input.

21. A method according to claim 19, wherein said hash control code is a multi-bit code, the state of each of at least some of the bits of the hash control code determining the presence or absence, in the step (b) combining, of a said version of the input that corresponds to the bit shifting of the input by an amount dependent on the position of the relevant hashing control-code bit in that code.

22. A method according to claim 18, wherein said at least portions of different versions of said input are combined by an exclusive-OR operation.

23. A method according to claim 18, wherein step (c) involves using selected bits of said transformed value to provide said output.

24. A method according to claim 23, wherein said selected bits are taken from said transformed value between a predetermined first bit position and a second bit position determined by a supplied index-width value.

25. A method according to claim 18, wherein step (b) involves producing said transformed value by combining portions only of said different versions of the input; step (c) involving using said transformed value for said output.

26. The method according to claim 18, wherein said method comprises operating a hashing functional entity to hash the multi-bit input to the shorter bit-length output, and said functional entity receives both said input and the hash code, the hash code being variable, and said hash control code sets the specific parameters of the forming in dependence on the current value of the hash control code.

27. A memory look-up method for accessing stored items which are held in respective locations in memory and which are associated with particular values of a multi-bit input, said method comprising the steps of:

(i)—receiving said input and an associated hash control code having a value set for that input;

(ii)—hashing said input to produce an index by using the method according to claim 1 with the output provided thereby forming said index, this index indicating a location in memory that holds a stored item associated with a said particular value of said input, and (iii)—using the index to access the memory.

28. A memory look-up method according to claim 27, wherein the memory location indicated by the index holds, in addition to the corresponding stored item, a validation value equal to one value of said input effective to result in access to that location, the memory look-up method comprising the further step of:

(iv)—comparing the validation value held in an accessed location with said input to validate accesses to the location only in cases where the input has said one value.

29. A memory look-up method according to claim 28, wherein in cases where the validation value differs from the input, steps (ii) to (iv) are repeated but using for said hash control code, a control code determined locally rather than a received one.

30. A memory look-up method according to claim 29, wherein steps (ii) to (iv) are repeated up to a given number of times, each time with a different locally-determined control code, until either an access is validated or said given number of repeats has been completed without a validated access being achieved.

31. A memory look-up method according to claim 29, wherein the locally-determined control code is selected from a set of such codes, this selection being dependent on the value of hash control code received in step (i).

32. The memory look-up method according to claim 27, wherein hashing said input to produce an index by using the method according to claim 19 comprises a method of operating a hashing functional entity to hash a multi-bit input to a shorter but-length output, said method comprising the steps of:

(a) receiving at the functional entity both said input and a variable hash control code;

(b) forming a transformed value by combining together at least portions of different versions of said input, said hash control code serving to set specific parameters of this forming in dependence on the current value of the hash control code; and (c) using said transformed value to provide said output.

33. Apparatus for retrieving items from a memory is response to the receipt of corresponding respective multi-bit inputs, said apparatus comprising:

means for receiving said input and an associated hash control code having a value set for that input;

means for forming a transformed value by combining together at least corresponding portions of multiple bit-shifted versions of said input, the number of such versions and their respective degrees of bit-shifting being determined by the current value of said hash control code;

means for using said transformed value to provide a hashed output having a shorter bit length than said input; and means for retrieving an item of said items from memory at an address in memory dependent on the value of said hashed output.

34. Apparatus according to claim 33, wherein said different versions of the input are bit-shifted versions of the input, the number of said different versions and their respective degrees of bit shifting being determined by said hash control code, said means for forming a transformed value comprising:

first register means for storing said input, the first register means being accessible over its length so as to permit access to said versions by appropriately offset access into the first register means;

second register means for storing said hash control code;

exclusive-OR means; and gate means connected to said first and second register means for controlling the passing to said exclusive-OR means of bits of said different versions of the input in dependence on the value of the hash control code, the output of said exclusive-OR means constituting said transformed value.

35. The apparatus according to claim 33, wherein said means for receiving receives a variable hash control code, and the number of such versions and their respective degrees of bit-shifting being determined by the current value of said variable hash control code.

* * * * *